United States Patent [19]
Parker et al.

[11] Patent Number: 5,193,107
[45] Date of Patent: Mar. 9, 1993

[54] SPEAKERPHONE TEST SET

[75] Inventors: Geoffrey H. Parker, Ventura; Andrew J. Hefley, Channel Islands Beach, both of Calif.

[73] Assignee: Harris Corporation, Melbourne, Fla.

[21] Appl. No.: 763,274

[22] Filed: Sep. 20, 1991

[51] Int. Cl.$^5$ .............................................. H04M 9/08
[52] U.S. Cl. ...................................... 379/21; 379/388; 379/420
[58] Field of Search ........................ 379/21, 22, 24, 27, 379/29, 388, 420

[56] References Cited

U.S. PATENT DOCUMENTS 4,691,336 9/1987 Durston ................................ 379/21
4,856,057 8/1989 Smith et al. ......................... 379/388

Primary Examiner—Stafford D. Schreyer
Attorney, Agent, or Firm—Evenson, Wands, Edwards, Lenahan & McKeown

[57] ABSTRACT

A telephone test set that performs dry loop testing of telephone lines has a passive speech network, a speakerphone circuit, and an amplifier and a speaker coupled to the speakerphone circuit. The passive speech network and the speakerphone circuit area isolated by the use of latching relays which are switched by a relay driver circuit that provides a short current burst. Line power can be used to power the speakerphone, so as to extend battery life of a battery which can augment the line power as needed.

27 Claims, 2 Drawing Sheets

SPEAKERPHONE TEST SET

FIELD OF THE INVENTION

The present invention relates to telephone test sets, and particularly, to telephone test sets which have a speakerphone for communication during repair procedures.

BACKGROUND OF THE INVENTION

A telephone test set is useful for performing various functions during routine maintenance operations on a telephone line by a telephone line technician. When the telephone line technician is communicating with the central office, it often happens that the call is place on hold. An auxiliary speaker was provided in an arrangement disclosed in U.S. Pat. No. 4,691,336, assigned to the assignee of the present invention. The speaker permitted the telephone line technician to place the unit on the technician's belt and listen to communications coming down the line from the central office which are amplified and broadcast by the loudspeaker while permitting the technician to perform other functions. The technician could use the amplifier and loudspeaker to listen for voice synthesized dispatches from the central office and communications from automated test equipment located in the central office.

Although allowing a technician to monitor a line without holding the test set to the ear, the test set disclosed in U.S. Pat. No. 4,691,336 is not really "hands-free" for two-way conversation, because the transmitting portion of the test set is muted when the amplified speaker is on to prevent acoustic feedback. Thus, the operator cannot talk back to the caller at the other end.

A microprocessor controlled "test set" incorporating a digital multimeter and a speakerphone has been produced by Ziad, Inc. A disadvantage of this test set is that it does not provide what is known as "dry loop operation". Dry loop operation is the use of a pair of test sets connected across opposite ends of a dead telephone pair, enabling the linepersons to identify a particular pair. In dry loop operation, the pair-under-test does not receive battery voltage from the Central Office. Instead a small external battery of 3 volts or less is usually used in series to provide the minimum voltage necessary to bias the polarity protection bridge in the test set. Dry loop operation precludes the use of electronic, integrated loop interface and speech network circuits for basic test set (non-speakerphone) use because of the minimum voltage and current required. An all passive speech network comprising a 2-to-4 wire hybrid transformer, carbon transmitter, and dynamic receiver must be used instead. The architecture of a speakerphone is incompatible with such a passive network.

There is a need for a test set which permits dry loop operation and still provides for hands-free two-way communication via a speakerphone.

SUMMARY OF THE INVENTION

This and other needs are met by the present invention which provides a telephone test set having means for performing dry loop testing of telephone lines, a passive speech network coupled to the means for performing dry loop testing, a speakerphone circuit, an amplifier and speaker coupled to the speakerphone circuit, and means for isolating the passive speech network and the speakerphone circuit.

The present invention allows dry loop operation to be performed by the test set, yet also provides for hands-free two-way communication via a speakerphone. The special case of dry loop operation precludes the use of electronic, integrated loop interface and speech network circuits for basic test set use, so that an all passive speech network must be used. Because of the incompatibility of any speakerphone with a passive network, the present invention provides means for isolating the speakerphone and the passive network. In an embodiment of the present invention, this isolating means are latching relays that perform the switching between the speakerphone and the passive speech network. These latching relays are provided with a short current burst to effect their switching, rather than the prior art switch which required continuous current. An embodiment of the present invention provides an elegant, low-power arrangement for providing the short current burst to the latching relays.

Another advantage provided by embodiments of the present invention is the use of line power to power the amplifier for the speaker when the test set is used as a speakerphone (two-way hands-free). The selection of the line power or the battery, or augmentation of the line power with battery power, extends the battery life. This avoids the annoyance of frequent battery changes, something which occurred in the prior art that used a battery for powering the amplifier of a speaker, because of the tendency of telephone line technicians to leave on the amplifier for purposes of one-way hands-free communication.

Other objects, advantages and novel features of the present invention will become apparent from the following detailed description of the invention when considered in conjunction with the accompanying drawings.

DETAILED DESCRIPTION OF THE DRAWINGS

Figure 1:
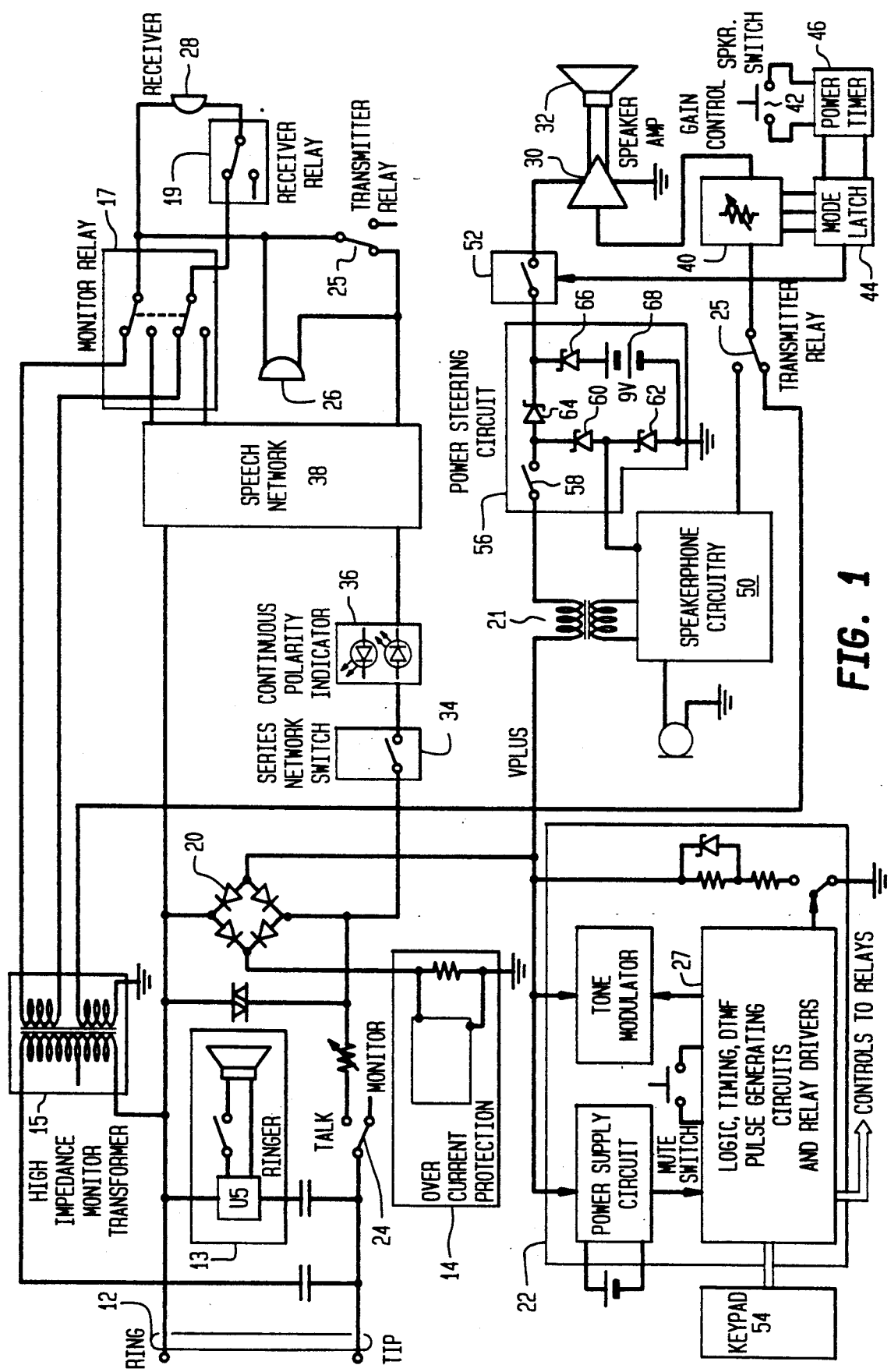
FIG. 1 shows a block diagram of a test set constructed in accordance with an embodiment of the present invention.

FIG. 1 illustrates a test set constructed in accordance with an embodiment of the present invention. The present invention is connected to a tip and a ring line of a telephone line by a coupling unit 12 which is of conventional construction that may include a pair of clips for selective connection to the tip and ring lines. A protection unit 14 is provided for overcurrent protection. A fullwave-rectifier 20 provides ground and positive potentials for application to signaling circuits 22.

A switch 24 permits the selective choice of the talk mode and the monitor mode. In the talk mode, the present invention activates the transmitter and receiver 26 and 28. In the monitor mode, the high impedance monitor transformer 15 couples signals on the telephone line to the receiver 28 to permit monitoring of the telephone line without disturbing the line in the manner known in the art. Alternatively, in the monitor mode, the amplifier 30 and speaker 32 may be activated to provide an audible reproduction of the line signals on the line being monitored by the speaker 32 including voice, synthesized voice, dialing and signalling signals appearing on the telephone line. In the monitor mode, the transmitter 26 is not active because there is no line current flowing though it. Also, in the monitor mode, the receiver is active via the high impedance monitor transformer 15. Feedback between the amplified speaker 32 and the receiver is not a problem since the transformer 15 provides enough isolation and attenuation between the receiver and the line.

The series network switch (relay) 34 is opened in response to the activation of the signalling circuits 22 to disconnect the transmitter 26 and receiver 28 from the telephone line during the activation of the signalling circuits. The continuous polarity indicator 36 is a pair of oppositely poled light emitting diodes which are respectively colored with different colors to permit the telephone line technician to visually determine the polarity of the individual lines of the telephone line to which the individual connectors of the coupling unit 12 are connected.

The speech network 38 includes a passive hybrid network of a construction similar to that which is used in ordinary telephone sets which is useful for the talk mode. A gain control 40 is provided for controlling the gain level of the output signal from the amplifier 30. The combination of a pushbutton speaker switch 42 and a mode latch 44 permits the telephone line technician to selectively operate the amplifier 30 and the speaker 32 to produce an audible representation of the signals appearing on the telephone line, as well as to allow the two-way speakerphone communication function of the present invention. The successive operation of the speaker switch 42 adjusts the speaker amplifier/speakerphone between three listening volumes and off in a known manner. The speaker amplifier switch 52 is selectively opened and closed under the control of the mode latch 44 to control the application of power to the amplifier 30.

A keypad assembly 54 is connected to the signalling circuits 22 to provide inputs for selectively activating the generation of DTMF tones. The signaling circuits 22 include power supply circuits, a tone modulator, load control circuit and logic, timing and DTMF tone generating circuit that can be of conventional construction, as are the rest of the components already described above. As such, individual schematic drawings illustrating the details of these components are not provided so as not to obscure the invention.

For dry loop operation, the use of electronic, integrated loop interface and speech network circuits for basic test set use are precluded because of the minimum voltage and current required. This is the reason the speech network 38 is all passive, and comprises a 2-to-4 wire hybrid transformer, carbon transmitter, and dynamic receiver. The architecture of a speakerphone, or for that matter, any electronic telephone, is incompatible with the passive network described above. A switching arrangement is needed to switch in the speakerphone or dialing circuit and remove the passive speech network.

In the prior art, the switching between the passive network and the dialing circuit was performed with an expensive FET switch that needed a lithium battery that continuously biased the FET's. In addition, an opto-isolator was used to turn off the normally-closed switch, and required 2 mA of continuous current to do so.

In the present invention, the more complex switching functions required by the speakerphone are performed by latching relays 17, 19, 25 and 34. (The two relays labeled 25 are part of the same relay and use a single driver.) Each relay requires a short (few milliseconds) 60 mA current burst through a set or reset coil to switch states. The short current burst uses considerably less energy than a continuous 2 mA current. An embodiment of a relay driver circuit that provides this pulse while avoiding the use of complicated, power-consumptive, complex microprocessors or one-shot multivibrators, is described below.

Figure 2:
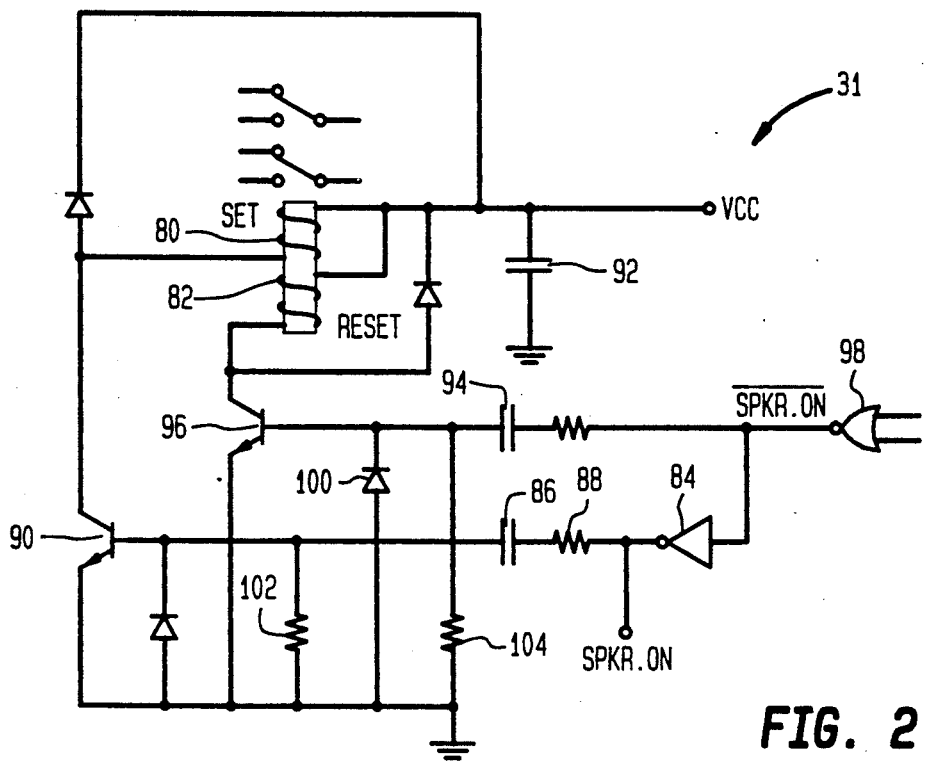
FIG. 2 is a schematic diagram of a relay driver circuit constructed in accordance with an embodiment of the present invention for use with the test set of FIG. 1.

The box labeled 27 in FIG. 1 contains individual relay driver circuits for each of the relays 17, 19, 25 and 34. A relay driver circuit 31 constructed in accordance with an embodiment of the present invention is illustrated in FIG. 2. The relay driver circuit 31 delivers, for example, a 5 ms, 60 mA current pulse through either the set coil 80 or the reset coil 82 of the latching relay. After the relay is activated and latched into a desired state, current through the appropriate coil is turned off to maintain battery life. The circuit 31 operates as follows.

An active-low CMOS level signal, SPKR ON is inverted by invertor 84 to provide complementary stimulus to the relay driver circuit 31. The low to high transition of the output of the invertor 84 is AC coupled via capacitor 86 and resistor 88 to the base of transistor 90. This transistor 90 is turned on until capacitor 86 charges up. During this time, capacitor 92 is discharged through the set relay coil 80, via transistor 90, latching the relay contacts into the set condition. The capacitor 92 stores energy from the line or a back-up battery to provide the short-high current pulse. In the complementary reset coil drive circuit, capacitor 94 discharges through NOR gate 98 which is low. Diode 100 provides a discharge path for capacitor 94. Capacitor 94 must be discharged otherwise, succeeding low to high transitions of SPKR ON will not activate the relay.

To latch a relay in the reset condition, the signal SPKR ON is set high and the complementary coil drive circuits work oppositely. In the quiescent (non-switching) condition, no current is drawn from the outputs of the invertor 84 or the NOR gate 98, due to the DC blocking action of capacitors 86 and 94. Resistors 102 and 104 provide a shunt path for any current leaking from capacitors 86 and 94. Otherwise, these leakage currents could be amplified by the Beta factor of transistors 90 and 96, pulling current through the relay coils 80, 82 and causing the internal battery to discharge.

Telephone line technicians tend to use the amplified speaker talk mode (one-way hands-free) with the test set of the prior art. As a result, the 9 volt battery that powers the amplifier must be changed frequently. To overcome this disadvantage, the present invention provides means for using the line power instead of the battery whenever possible in the speakerphone mode. This is possible due to the speakerphone being essentially an electronic telephone, in contrast to the passive speech network, and therefore more readily able to be powered off of the line.

Figure 3:
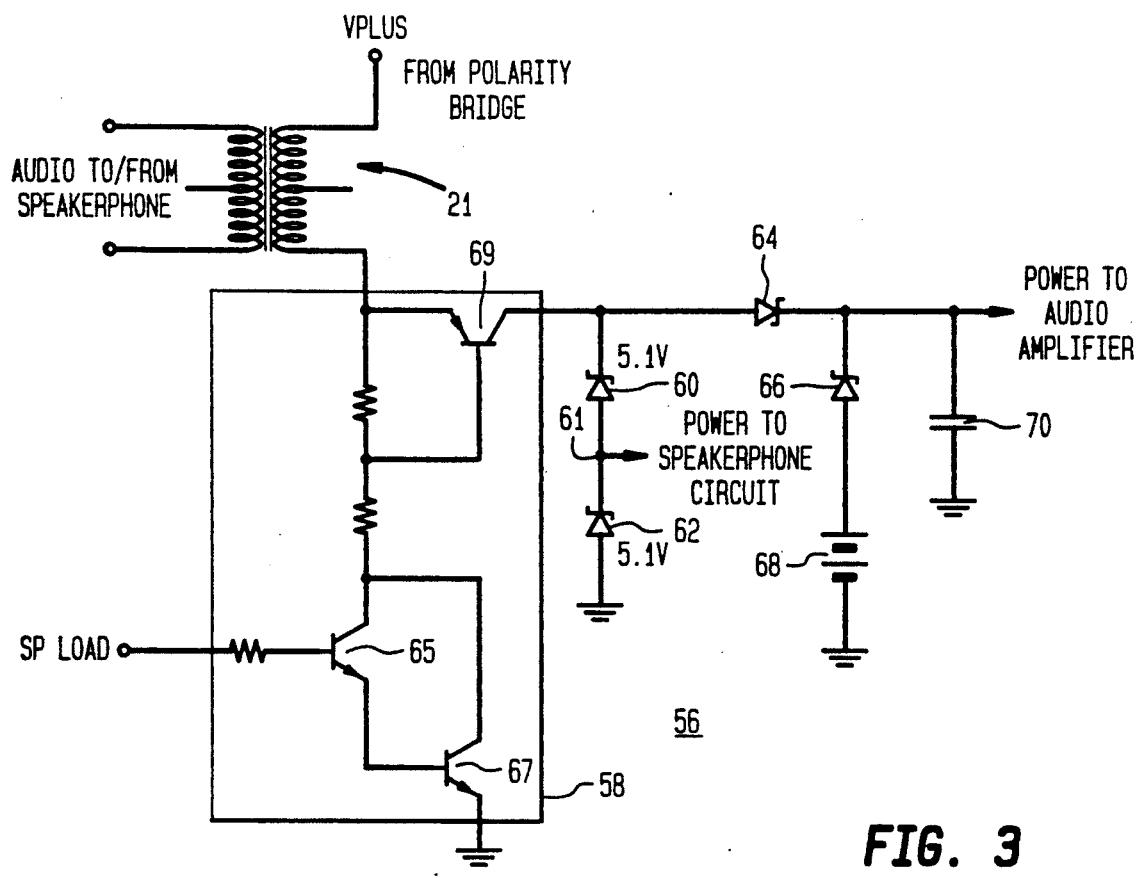
FIG. 3 is a schematic diagram of a line/battery power steering circuit constructed in accordance with an embodiment of the present invention for use with the test set of FIG. 1.

FIG. 3 is a schematic diagram of the line/battery power steering circuit 56 already partially shown in FIG. 1. This circuit 56 operates to steer power from the line or battery to the speaker amplifier 32.

To turn on the speakerphone, a high level at signal SP_LOAD turns on the darlington pair 65, 67 which turns on pass transistor 69. Line current flows through the speakerphone transformer 21. This transformer 21 couples the transmit and receive audio to and from the speakerphone circuit 50. The current passes through pass transistor 69 and biases a zener stack 60, 62 to approximately 10.2 volts, assuming there is sufficient current. A 5.1 volt tap 61 between zener diodes 60, 62 supplies power to the speakerphone circuit 50. Schottky diodes 64, 66 act as steering diodes to switch power between the line and a replaceable 9 volt battery 68. Line power flows through Schottky diode 64 if the collector voltage of pass transistor 69 is greater than the voltage on the 9 volt battery 68. Otherwise, Schottky diode 64 is reverse biased and battery current flows through Schottky diode 66 instead. The selection of the zener stack to be biased to approximately 10.2 volts is based on the considerations of: being higher voltage than a standard 9 volt battery, allowing the line/battery power steering circuit to operate in the intended manner; and providing a relatively higher volume for the speaker.

The source of amplifier current is based on three parameters: the amount of line current available, the condition or presence of the battery 68, and the current required by the amplifier 30. In long loop conditions (20 mA or less loop current), the voltage across the zener stack 60, 62 will not be sufficient to bias Schottky diode 64, and amplifier power will come from the battery 68. As loop current is increased, both Schottky diodes 64, 66 will conduct, meaning both the line and the battery 68 are partially supplying power to the amplifier 30. At higher loop currents, Schottky diode 66 will turn off, resulting in all amplifier power being derived from the line. In this condition, the battery 68 provides the additional power needed for amplifier peaks. Capacitor 70 acts to filter out the "noise" caused by the diode switching action during peaks. Without capacitor 70, severe distortion occurs at loud speaker volumes.

A trade-off of using the line to power a speakerphone is the increased voltage drop across the tip and ring pair of the telephone line compared to a normal telephone. This is due to the 10.2 voltage drop across the zener diodes 60, 62 and the IR drop across the winding resistance (e.g. 60 ohm) of the transformer 21. This increased voltage may cause problems in some test conditions. Also, in noisy environments, it may be desirable to mute speakerphone transmissions to the line so that there is no switching interference with the received party. By depressing the transmitter mute switch while in the speakerphone mode, the test set is forced to fall back into a one-way hands-free mode. Additional relays and logic are used to achieve the necessary switching of loads.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A telephone test set circuit comprising:
   means for performing dry loop testing of telephone lines;
   a passive speech network coupled to the means for performing dry loop testing;
   a speakerphone circuit;
   an amplifier and speaker coupled to the speakerphone circuit; and
   means for isolating the passive speech network and the speakerphone circuit.

2. The telephone test set circuit of claim 1, wherein the means for isolating includes latching relays coupled to the passive speech network and to the speakerphone circuit and that selectively switched to couple the passive speech network and the speakerphone circuit into and out of the circuit.

3. The telephone test set circuit of claim 2, wherein each latching relay requires a short current burst through the set or reset coil to be switched.

4. The telephone test set circuit of claim 3, further comprising means for switching each latching relay, said means for switching only consuming power during the switching action.

5. The telephone test set circuit of claim 4, wherein the means for switching includes a first transistor with a base coupled to a first capacitor, a second transistor with a base coupled to a second capacitor, a first resistor coupled between the base of the first transistor and ground, a second resistor coupled between the base of the second transistor and ground, a set coil coupled to the first transistor, a reset coil coupled to the second transistor, a capacitor coupled to the set coil, a diode coupled between the base of the second transistor and ground providing a discharge path for the second capacitor, and another diode coupled between the base of the first transistor and ground providing a discharge path for the first capacitor.

6. The telephone test set circuit of claim 5, further comprising means for powering the amplifier and the speaker from the telephone line.

7. The telephone test set circuit of claim 6, wherein the means for powering the amplifier and the speaker from the telephone line includes a transformer coupled to the telephone line, a first transistor and a diode coupled between the transistor and the amplifier and through which line power is supplied to the amplifier when a collector voltage of the transistor is greater than a predetermined voltage.

8. The telephone test set circuit of claim 7, further comprising: means for powering the amplifier and the speaker from at least one of a battery or the telephone line.

9. The telephone test set circuit of claim 8, wherein the means for powering the amplifier and the speaker includes means for selecting at least one of a battery or the telephone line to supply power as a function of: amount of available line current; condition or presence of the battery; and current required by the amplifier.

10. The telephone test set circuit of claim 9 wherein the means for selecting includes a battery, a transformer coupled to the telephone lines, a pass transistor coupled to the transformer, a darlington pair of transistors coupled to the base of the pass transistor and controlling the pass transistor, a zener stack coupled between the pass transistor and ground and having a tap coupled to the speakerphone circuit, a first diode coupled between the pass transistor and the amplifier, and a second diode coupled between the first diode and the battery.

11. The telephone test set circuit of claim 10, further comprising a capacitor coupled between the first diode and ground which filters noise caused by diode switching action.

12. The telephone test set circuit of claim 11, wherein the zener stack includes first and second zener diodes, and wherein the voltage between the second zener diode and ground powers the amplifier and the voltage between the first zener diode and ground powers the speakerphone circuit.

13. The telephone test set circuit of claim 12, further comprising means for switching from a two-way speakerphone mode to a one-way amplifier speaker mode.

14. The telephone test set circuit of claim 1, further comprising means for powering the amplifier and the speaker from the telephone line.

15. The telephone test set circuit of claim 14, wherein the means for powering the amplifier and the speaker from the telephone line includes a transformer coupled to the telephone line, a first transistor and a diode coupled between the transistor and the amplifier and through which line power is supplied to the amplifier when a collector voltage of the transistor is greater than a predetermined voltage.

16. The telephone test set circuit of claim 1, further comprising: means for powering the amplifier and the speaker from at least one of a battery or the telephone line.

17. The telephone test set circuit of claim 16, wherein the means for powering the amplifier and the speaker includes means for selecting at least one of a battery or the telephone line to supply power as a function of: amount of available line current; condition or presence of the battery; and current required by the amplifier.

18. The telephone test set circuit of claim 17, wherein the means for selecting includes a battery, a transformer coupled to the telephone lines, a pass transistor coupled to the transformer, a darlington pair of transistors coupled to the base of the pass transistor and controlling the pass transistor, a zener stack coupled between the pass transistor and ground and having a tap coupled to the speakerphone circuit, a first diode coupled between the pass transistor and the amplifier, and a second diode coupled between the first diode and the battery.

19. The telephone test set circuit of claim 18, further comprising a capacitor coupled between the first diode and ground which filters noise caused by diode switching action.

20. The telephone test set circuit of claim 19, wherein the zener stack includes first and second zener diodes, and wherein the voltage between the second zener diode and ground powers the amplifier and the voltage between the first zener diode and ground powers the speakerphone circuit.

21. The telephone test set circuit of claim 1, further comprising means for switching from a two-way speakerphone mode to a one-way amplifier speaker mode.

22. A telephone test set circuit comprising:
means for performing testing of telephone lines;
a speakerphone circuit;
an amplifier and speaker coupled to the speakerphone circuit; and
means for powering the amplifier and the speaker from at least one of the telephone line or a battery, wherein the means for powering includes a switch coupled to the telephone line, and an all-passive component network coupled to the battery and between the switch and the amplifier and the speaker.

23. A telephone test set circuit comprising:
means for performing testing of telephone lines;
a speakerphone circuit;
an amplifier and speaker coupled to the speakerphone circuit; and
means for powering the amplifier and the speaker from the telephone line;
wherein the means for powering the amplifier and the speaker from the telephone line includes a transformer coupled to the telephone line, a first transistor and a diode coupled between the transistor and the amplifier and through which line power is supplied to the amplifier when a collector voltage of the transistor is greater than a predetermined voltage.

24. The telephone test set circuit of claim 23, wherein the means for powering the amplifier and the speaker includes means for selecting at least one of a battery or the telephone line to supply power as a function of: amount of available line current; condition or presence of the battery; and current required by the amplifier.

25. The telephone test set circuit of claim 24, wherein the means for selecting includes a battery, a transformer coupled to the telephone lines, a pass transistor coupled to the transformer, a darlington pair of transistors coupled to the base of the pass transistor and controlling the pass transistor, a zener stack coupled between the pass transistor and ground and having a tap coupled to the speakerphone circuit, a first diode coupled between the pass transistor and the amplifier, and a second diode coupled between the first diode and the battery.

26. The telephone test set circuit of claim 25, further comprising a capacitor coupled between the first diode and ground which filters noise caused by diode switching action.

27. The telephone test set circuit of claim 26, wherein the zener stack includes first and second zener diodes, and wherein the voltage between the second zener diode and ground powers the amplifier and the voltage between the first zener diode and ground powers the speakerphone circuit.

* * * * *